United States Patent
Sakamoto et al.

(10) Patent No.: US 10,538,047 B2
(45) Date of Patent: Jan. 21, 2020

(54) PNEUMATIC TIRE MANUFACTURING METHOD, AND PNEUMATIC TIRE

(71) Applicant: SUMITOMO RUBBER INDUSTRIES, LTD., Kobe-shi, Hyogo (JP)

(72) Inventors: Masayuki Sakamoto, Kobe (JP); Takamichi Sagawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 155 days.

(21) Appl. No.: 15/523,600

(22) PCT Filed: Nov. 4, 2015

(86) PCT No.: PCT/JP2015/081044
§ 371 (c)(1),
(2) Date: May 1, 2017

(87) PCT Pub. No.: WO2016/076176
PCT Pub. Date: May 19, 2016

(65) Prior Publication Data
US 2017/0313006 A1    Nov. 2, 2017

(30) Foreign Application Priority Data
Nov. 10, 2014    (JP) .................... 2014-228349

(51) Int. Cl.
*B60C 11/01*    (2006.01)
*B29D 30/08*    (2006.01)
(Continued)

(52) U.S. Cl.
CPC ............. *B29D 30/30* (2013.01); *B29D 30/32* (2013.01); *B29D 30/72* (2013.01); *B60C 11/01* (2013.01);
(Continued)

(58) Field of Classification Search
CPC ......... B60C 11/0041; B60C 2011/0091; B60C 2011/016; B60C 2013/008; B60C 2013/045
(Continued)

(56) References Cited

U.S. PATENT DOCUMENTS

| | | | |
|---|---|---|---|
| 4,007,069 A | 2/1977 | Takayanagi et al. | |
| 2006/0000530 A1* | 1/2006 | Hirai | B60C 13/00 152/450 |

(Continued)

FOREIGN PATENT DOCUMENTS

| | | |
|---|---|---|
| CN | 1781739 A | 6/2006 |
| CN | 101535065 A | 9/2009 |

(Continued)

OTHER PUBLICATIONS

Office Action dated Apr. 11, 2017, in Japanese Patent Application No. 2014-228349, with parital English translation.

(Continued)

*Primary Examiner* — Kendra Ly
(74) *Attorney, Agent, or Firm* — Birch, Stewart, Kolasch & Birch, LLP

(57) ABSTRACT

A pneumatic tire manufacturing method is provided in which raw cover molding is suitably performed with no, or a minimal amount of, down-stitching in the manufacture of SOT-structure pneumatic tires; also provided is a pneumatic tire. This pneumatic tire manufacturing method involves a first cover molding step for molding a first cover having a sidewall, an inner lining, a ply, beads and a tread-side edge, a tread ring forming step for forming a tread ring having a breaker, a band and a tread center part, a shaping step for pressure-bonding the tread ring and the first cover to mold this to the shape of the raw cover, and a turn-up step for bonding the side wall to the lateral surface of the first cover, (Continued)

wherein the tread-side edge is formed in a position adjacent to the end of the tread center portion in the shaping step, and in the turn-up step, the tread-side edge and the tread center part are bonded together.

5 Claims, 6 Drawing Sheets

(51) Int. Cl.
*B29D 30/30* (2006.01)
*B29D 30/32* (2006.01)
*B29D 30/72* (2006.01)
*B60C 11/00* (2006.01)

(52) U.S. Cl.
CPC . *B60C 2011/0091* (2013.01); *B60C 2011/016* (2013.01)

(58) Field of Classification Search
USPC .............. 156/130.7, 128.1, 127; 152/209.16, 152/209.5
See application file for complete search history.

(56) References Cited

U.S. PATENT DOCUMENTS

| | | | |
|---|---|---|---|
| 2006/0054259 A1* | 3/2006 | Takahashi | B29D 30/72 152/525 |
| 2007/0102088 A1* | 5/2007 | Hayashi | B29D 30/3028 152/532 |
| 2010/0078103 A1 | 4/2010 | Nakamura | |

FOREIGN PATENT DOCUMENTS

| | | |
|---|---|---|
| EP | 1666236 A1 | 6/2006 |
| EP | 2380728 B1 | 8/2013 |
| JP | 2009-51415 A | 3/2009 |
| JP | 2013-39695 A | 2/2013 |
| JP | 2013-188866 A | 9/2013 |
| WO | WO 99/48706 A1 | 9/1999 |

OTHER PUBLICATIONS

International Search Report for PCT/JP2015/081044 (PCT/ISA/210) dated Dec. 8, 2015.
Written Opinion of the International Searching Authority for PCT/JP2015/081044 (PCT/ISA/237) dated Dec. 8, 2015.
Braess et al., "Automotive Engineering Handbook German Version," China Machine Press, Feb. 29, 2012, p. 544 (2 pages total).
Chen, "Vehicle Operational Consumption Materials," China Forestry Publishing House, Aug. 31, 2013, pp. 269-270 (3 pages total).
Chinese Office Action and Search Report for Chinese Application No. 201580058226.X, dated Mar. 14, 2019, with English translation of the Office Action.
Chinese Office Action and Search Report for Chinese Application No. 201580058226.X, dated Oct. 23, 2018, with English translation of the Office Action.
Extended European Search Report for European Application No. 15859331.9, dated Mar. 23, 2018.

* cited by examiner

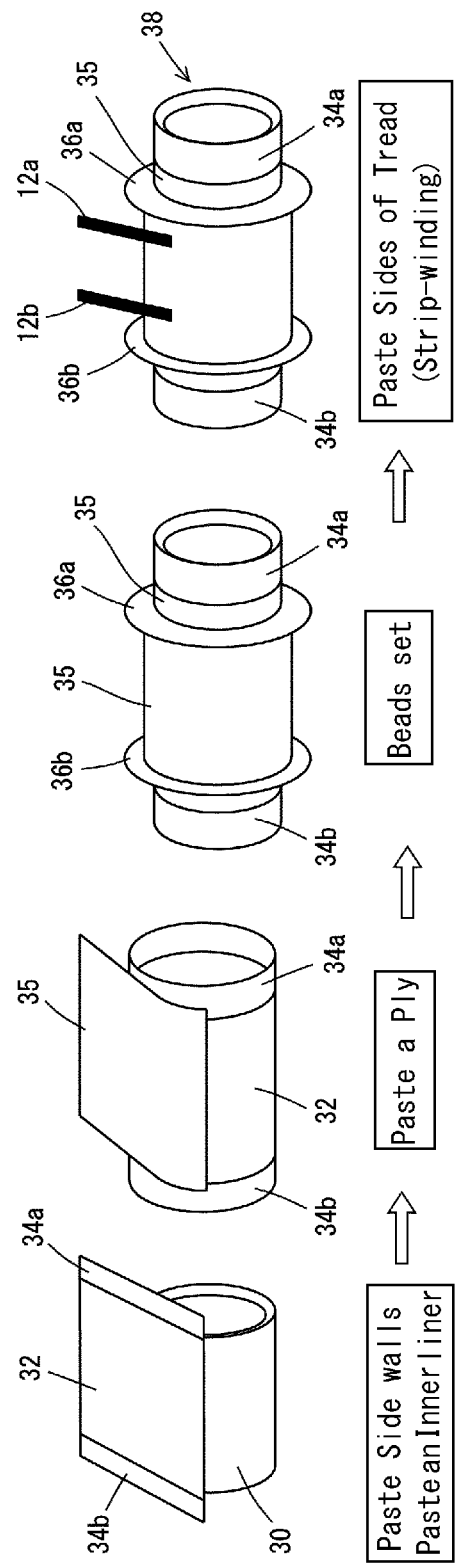
[FIG.1]

[FIG.2]
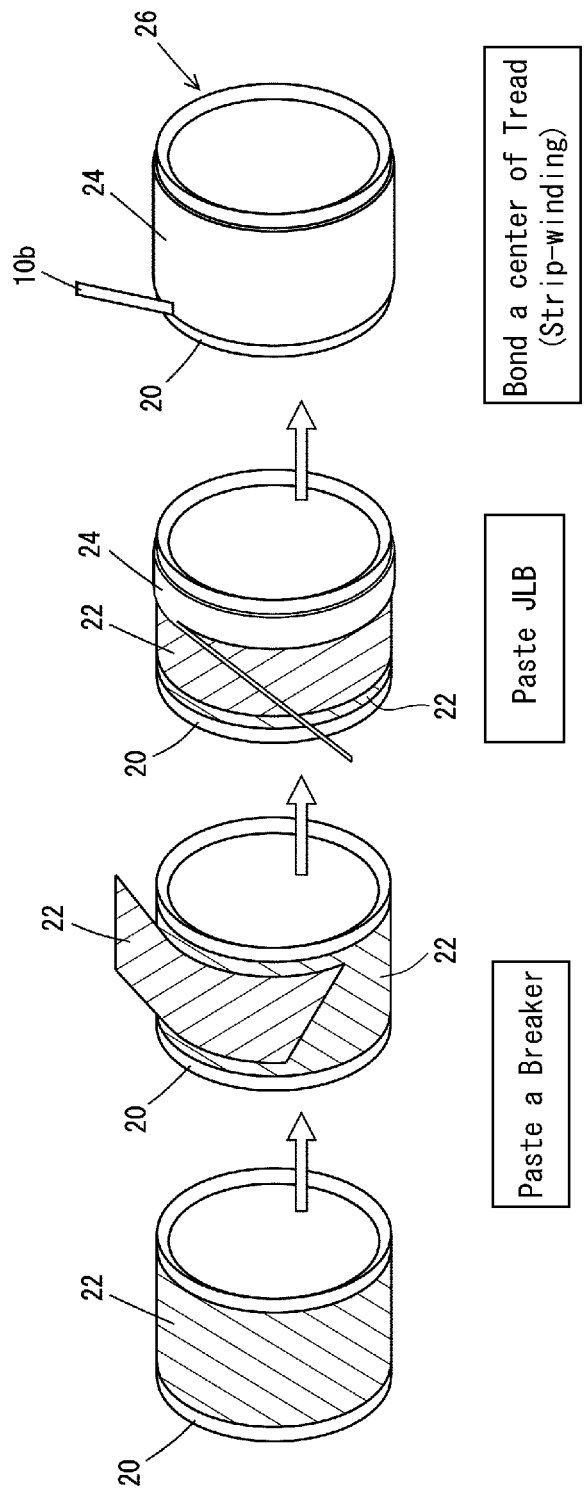

[FIG.3]
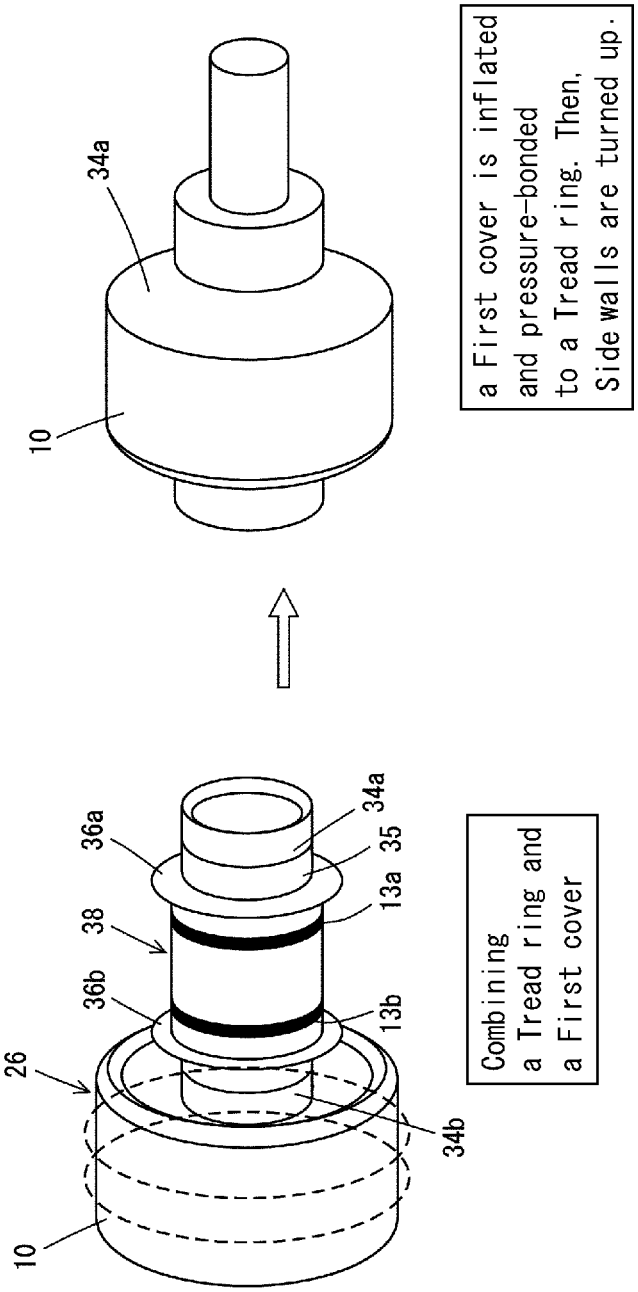

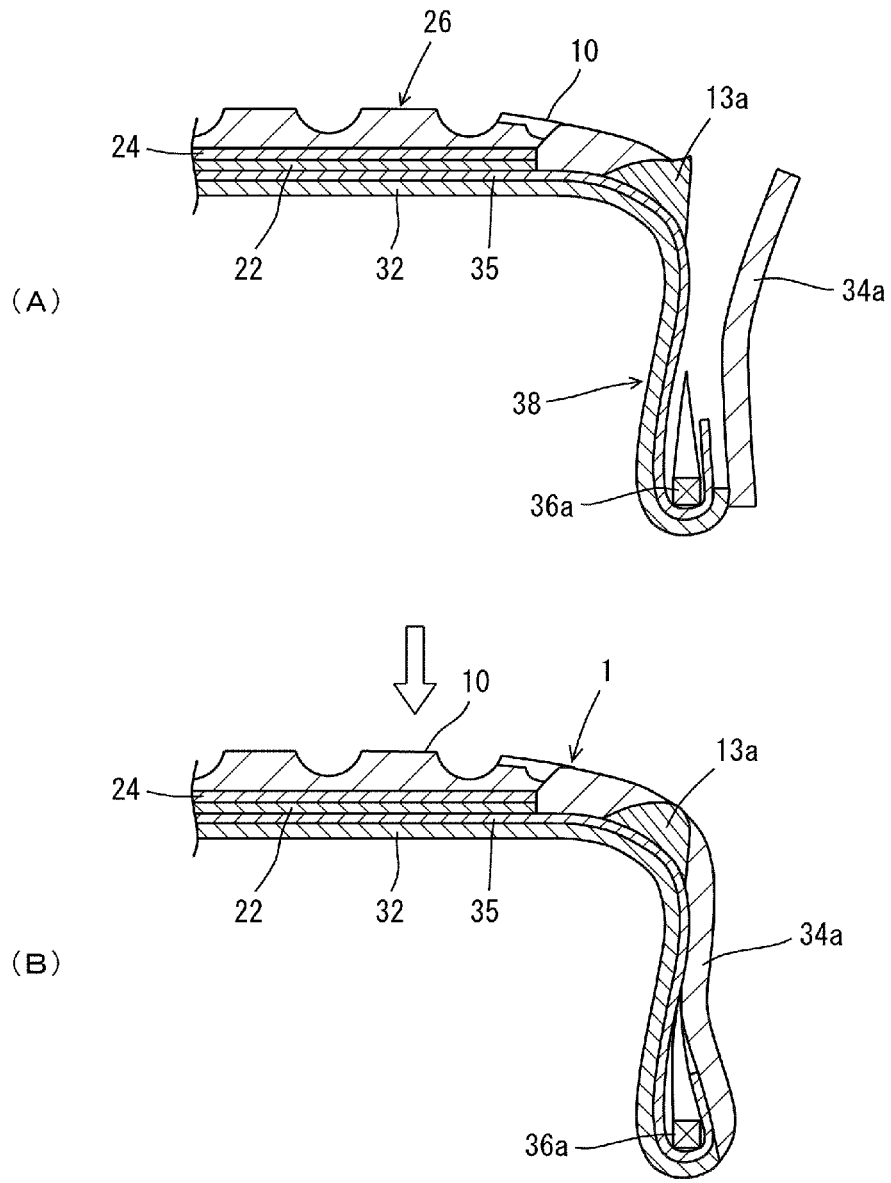
[FIG.4]

[FIG.5]
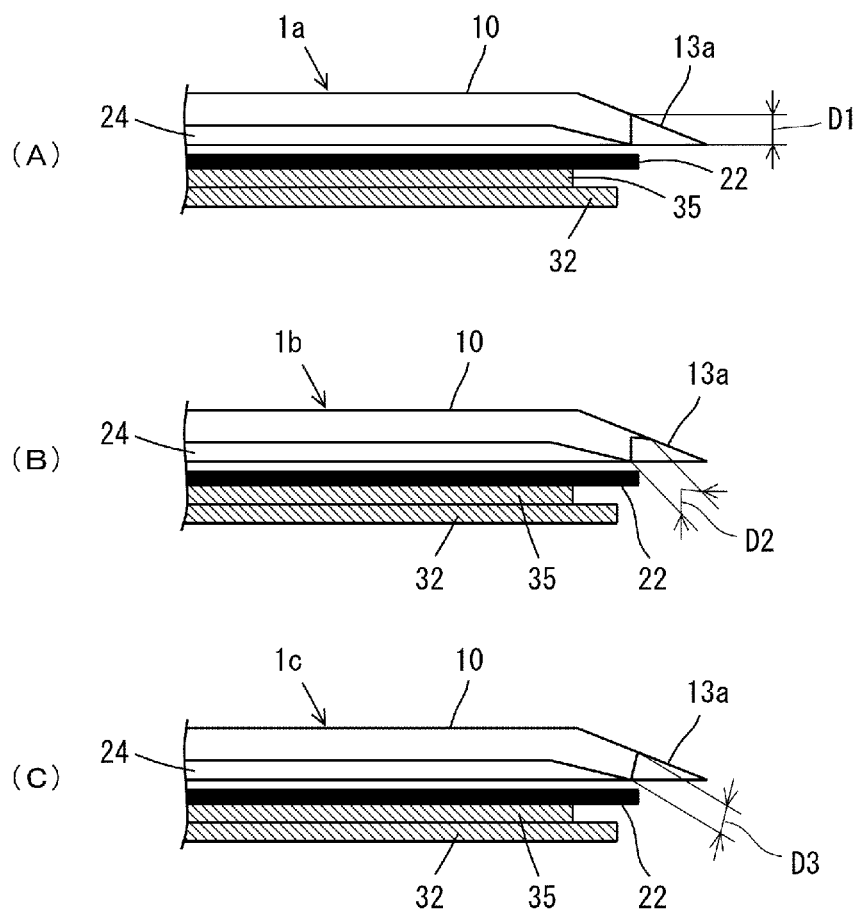

[FIG.6]
--PRIOR ART--
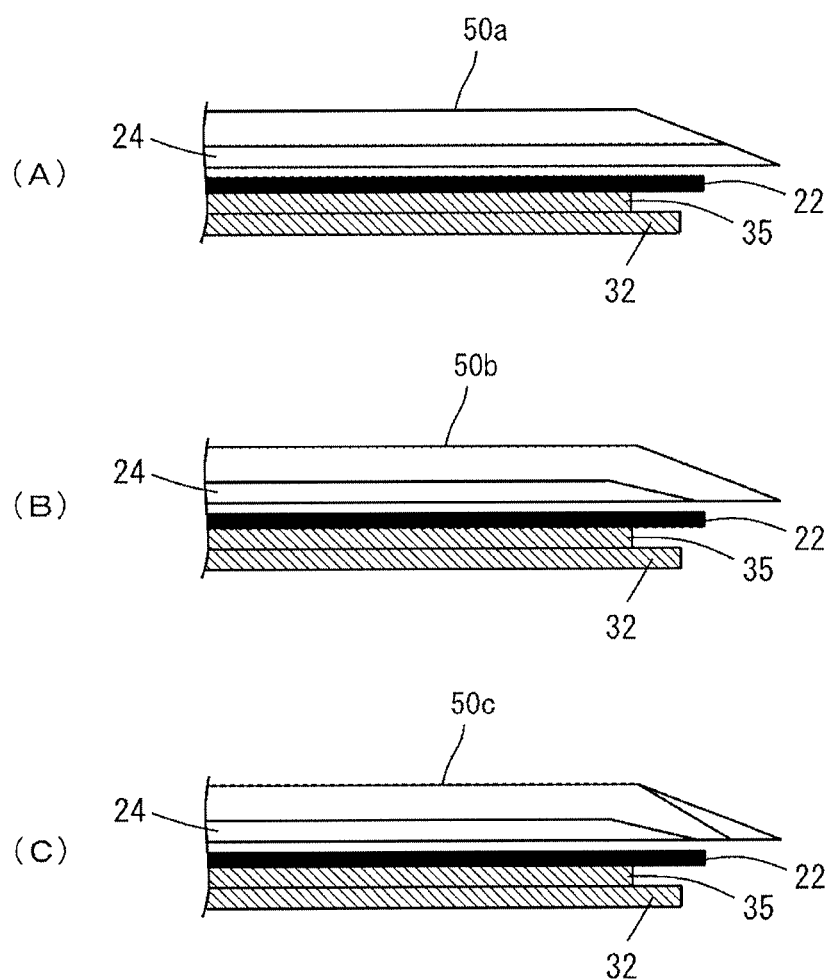

PNEUMATIC TIRE MANUFACTURING METHOD, AND PNEUMATIC TIRE

TECHNICAL FIELD

The present invention relates to a method of manufacturing a pneumatic tire having a so-called SOT (Sidewall Over Tread) structure, having sidewalls formed to cover tread ends, and to a pneumatic tire manufactured using this method.

BACKGROUND ART

Generally, a pneumatic tire having the SOT structure has its low cover formed in two steps.

Specifically, first, a sidewall is wrapped on opposite side portions of a first forming drum and, thereafter, on the central portion of the first forming drum, an inner liner and a ply are pasted successively. Then, a pair of beads is set inside the sidewalls, at positions corresponding to the width of the tire product. Thus, the first cover is formed (first cover forming step).

On the other hand, in parallel with the formation of first cover, on a second forming drum, a breaker and a band such as JLB (jointless band) are pasted and thereafter, a tread is wrapped by strip-winding, whereby a tread ring is formed (tread ring forming step).

Then, the first cover is inserted to the inside of tread ring, and that portion of the first cover which is between the beads is inflated and pressure-bonded to the tread ring, to form a shape close to that of the low cover (shaping step).

Thereafter, in order that the tread is pressure-bonded to the first cover with no gap left therebetween, sides of tread are pressed by using a stitcher so that the sides extend along a curved side surface of the first cover that has been pressure-bonded to the tread ring (stitch-down step).

Thereafter, the sidewall outer than the bead is turned up toward the side surface of inflated first cover, and the sidewall is pasted to cover the tread end (turn-up step). In this manner, the first cover and the tread ring are integrated and the formation of low cover is completed (for example, see Patent Documents 1, 2).

PRIOR ART DOCUMENT

Patent Document

Patent Document 1: JP-A-2013-39695
Patent Document 2: JP-A-2013-188866

SUMMARY OF THE INVENTION

Problems to be Solved by the Invention

The above-described stitch-down step, however, is a step of making the tread ring smaller in diameter and thereby to make it extend along the curved first cover. It is not easy to appropriately conduct stitch-down to exhibit desirable tire functions and it also poses a problem in increasing production efficiency.

For example, stitch-down is conducted while rotating the drum, and, therefore, if the speed of rotation is increased, the shape of low cover comes to be nonuniform and it becomes more difficult to maintain shape accuracy. Further, depending on the width of a stitcher roller, defects such as scratches and wrinkles may generate on the tread surface. Low covers as such have to be discarded as defective products and, hence, production efficiency decreases.

Further, stitcher operation for the stitch-down is complicated and hence, the stitcher must have a complicated structure, increasing cost of the equipment.

Therefore, an object of the present invention is to provide a method of manufacturing a pneumatic tire having the SOT structure eliminating or minimizing necessity of stitch-down while enabling satisfactory formation of the low cover, as well as to provide a pneumatic tire manufactured through this method.

Means of Solving the Problems

The present inventors conducted extensive studies in order to solve the above problems. As a result, it was found that the above problems can be solved by inventions described below. Thus the present invention has been completed.

The invention according to claim 1 provides
a method of manufacturing a pneumatic tire having a sidewall-over-tread structure with the sidewall formed to cover tread ends, comprising:
the first cover forming step of wrapping sidewalls on opposite end portions of a first forming drum, pasting an inner liner and a ply on the center of the first forming drum, setting a pair of beads inside said sidewalls, and forming sides of tread by strip-winding on said ply inside said beads, and thereby forming a first cover;
the tread ring forming step of successively pasting, on a second forming drum, a breaker and a band and then forming a center of tread by strip-winding on said band, and thereby forming a cylindrical tread ring;
the shaping step of inserting said first cover inside said tread ring, and inflating that portion of said first cover which is between the said beads, and thereby pressure-bonding said tread ring with said first cover to form a shape of a low cover, and
the turn-up step of turning said sidewalls outside of said beads toward side surfaces of said inflated first cover and pasting said sidewalls on the side surfaces of said first cover, wherein
each of said sides of tread is formed at positions outside said band to be adjacent to respective ends of the center of tread when the first cover is inflated at the shaping step,
and bonding said sides of tread on the first cover and said center of tread on said tread ring at the turn-up step.

The invention according to claim 2 provides the method of manufacturing a pneumatic tire according to claim 1, wherein
at the turn-up step, said sides of tread of the first cover and said center of tread on said tread ring are bonded, overlapped by at least 5 mm in the axial direction of the tire.

The invention according to claim 3 provides the method of manufacturing a pneumatic tire according to claim 1 or 2, wherein
at the turn-up step, a bonding surface of said side of tread of the first cover and said center of the tread on said tread ring is approximately vertical to the outer surface of said tread, or is a tapered surface inclined toward said sidewall from the outer surface of said thread to an inner surface of said tread.

The invention according to claim 4 provides a pneumatic tire which is manufactured using the method of manufacturing a pneumatic tire according to any one of claims 1 to 3.

Effect of the Invention

By the present invention, a method of manufacturing a pneumatic tire having the SOT structure, eliminating stitch-down or minimizing necessity of stitch-down while enabling satisfactory forming of the low cover, as well as a pneumatic tire manufactured through this method can be provided.

BRIEF DESCRIPTION OF THE DRAWINGS

FIG. 1 Schematic illustrations showing the first cover forming step of the method of manufacturing a pneumatic tire in accordance with an embodiment of the present invention.

FIG. 2 Schematic illustrations showing the tread ring forming step of the method of manufacturing a pneumatic tire in accordance with an embodiment of the present invention.

FIG. 3 Schematic illustrations showing the low cover forming step of the method of manufacturing a pneumatic tire in accordance with an embodiment of the present invention.

FIG. 4 Schematic illustrations showing processes from the shaping step to the turn-up step of the method of manufacturing a pneumatic tire in accordance with an embodiment of the present invention.

FIG. 5 Schematic illustrations showing cross section of the tread portion of low cover manufactured using the method of manufacturing a pneumatic tire in accordance with an embodiment of the present invention.

FIG. 6 Schematic illustrations showing cross section of the tread portion of low cover manufactured using the conventional method of manufacturing a pneumatic tire.

EMBODIMENTS FOR CARRYING OUT THE INVENTION

The present invention will be described below specifically with reference to the drawings.

Similar to the conventional method of manufacturing a pneumatic tire, the method of manufacturing a pneumatic tire in accordance with the present invention includes:
the first cover forming step of forming a first cover on a first forming drum; the tread ring forming step of forming a tread ring on a second forming drum;
the shaping step of inserting said first cover to the inside of the tread ring, inflating the first cover and thereby pressure-bonding it with the tread ring to attain approximately the shape of a low cover; and
the turn-up step of turning up sidewalls to side surfaces of the first cover and pasting the sidewalls to cover the tread ends.

The method of manufacturing a pneumatic tire in accordance with the present embodiment, however, is different from the conventional method of manufacturing a pneumatic tire in that the tread is divided to the center and sides. Specifically, the method of the present invention is different from the conventional method of manufacturing a pneumatic tire in that:
at the first cover forming step, the sides of tread are formed by strip-winding on the ply inside the pair of beads;
at the tread ring forming step, the center of tread is formed on the band by strip-winding; and
at the turn-up step, the sides of tread are pasted to the center of tread.

Specific processes of the method of manufacturing a pneumatic tire in accordance with an embodiment of the present invention will be described below.

(1) First Cover Forming Step

FIG. 1 includes schematic illustrations showing the first cover forming step of the method of manufacturing a pneumatic tire in accordance with an embodiment of the present invention. As shown in FIG. 1, at the first cover forming step, first, sidewalls (sw) 34a, 34b are wrapped on opposite sides of a first forming drum 30, and then, at the central portion of first forming drum 30, a sheet-shaped inner liner 32 and a ply 35 are pasted.

Next, a pair of beads 36a, 36b is set inner than sidewalls 34a, 34b. The space between the pair of beads 36a, 36b to be set is appropriately selected in accordance with the width of the tire product.

Next, on the ply inside the pair of beads 36a, 36b, strip-shaped tread rubber materials 12a, 12b are wound spirally (strip-winding), whereby sides 13a, 13b of tread (see FIG. 3) are formed Thus, formation of the first cover 38 is completed. Winding of tread rubber material 12a, 12b may be performed before setting the pair of beads 36a, 36b.

Tread sides 13a and 13b are formed appropriately at positions outside a JLB (jointless band) 24, which will be described later, inner than beads 36a, 36b, to be adjacent to respective ends of the center of tread formed on the tread ring when the first cover 38 is inflated at the shaping step described later.

(2) Tread Ring Forming Step

FIG. 2 includes schematic illustrations showing the tread ring forming step of the method of manufacturing a pneumatic tire in accordance with an embodiment of the present invention. As shown in FIG. 2, at the tread ring forming step, first, two sheet-shaped breakers 22 are wrapped around and pasted on a second forming drum 20 and, thereafter, JLB 24 is formed by strip-winding on the breaker 22.

Next, on JLB 24, strip-shaped tread rubber material 10b is wrapped spirally by strip-winding and thus, a center 10 of tread (see FIG. 3) is formed. Thus, forming of tread ring 26 is completed.

(3) Shaping Step

FIG. 3 includes schematic illustrations showing the shaping step of the method of manufacturing a pneumatic tire in accordance with an embodiment of the present invention. As shown in FIG. 3, at the shaping step, first, the first cover 38 is inserted to the inside of cylindrical tread ring 26 and combined.

Thereafter, the first cover 38 between the beads 36a, 36b is inflated, so that tread ring 26 and the first cover 38 are pressure-bonded, and the resulting body as a whole is formed to have the shape of a low cover.

At this time, as shown in FIG. 4(A), tread side 13a formed on the ply 35 of first cover 38 is to be adjacent to respective ends of the center 10 of tread formed on the tread ring 26. FIG. 4 includes schematic illustrations showing processes from the shaping step to the turn-up step of the method of manufacturing a pneumatic tire in accordance with an embodiment of the present invention, depicting a right-half of a symmetrical structure.

(4) Turn-Up Step

At the turn-up step, sidewall 34a outside bead 36a is turned up and pasted to a side surface of inflated first cover 38 and, as shown in FIG. 4(B), the side 13a of tread on the first cover 38 and the center 10 of tread on tread ring 26 are bonded together to form tread 1, and thus, formation of the low cover of pneumatic tire having the SOT structure is completed.

In the foregoing, in order to effectively prevent any gap formed between the side 13a and the center 10 of tread, which may lead to residual air, it is preferred that the side 13a and the center 10 of tread are bonded appropriately overlapped in the axial direction of the tire. Specifically, overlapping by at least 5 mm is preferred.

The bonding surface between the side 13a and the center 10 of tread should preferably be a shape as shown in FIG. 5(A), (B) or (C), or a tapered surface, tapered from the outer surface side to the inner surface side of the tread, inclined to the sidewall (5) Vulcanizing Step Then, the low cover made in this manner is vulcanized by a tire-vulcanizer and a pneumatic tire is manufactured. As shown in FIG. 5, the bonded side 13a and center 10 of tread are formed of rubber having the same composition and, therefore, during vulcanization, these are integrated and form the tread of pneumatic tire. Therefore, by using the method of manufacturing a pneumatic tire in accordance with the present embodiment, a pneumatic tire having the SOT structure similar to the conventional pneumatic tire shown in FIG. 6 can appropriately be manufactured without necessitating the conventional stitch-down step. In FIGS. 5, 1a, 1b and 1c represent various types of treads in accordance with the present embodiment, and in FIGS. 6, 50a, 50b and 50c represent various types of treads in accordance with the conventional method of manufacturing a pneumatic tire.

(6) Effects of the Present Embodiment

As described above, in the present embodiment, the tread, which has been formed as one body, is formed separately as a center and sides of tread, the center of tread is formed on the tread ring and the sides are formed on the first cover, and these are bonded when the low cover is made. Therefore, various problems occurred in the conventional method of manufacturing a pneumatic tire can be solved.

Specifically, during the stitch-down in the conventional pneumatic tire manufacturing method, the tread ring is made smaller in diameter by compressing rubber while the drum is being rotated, so as to make the tread extend along the first cover. Therefore, if the speed of rotation is increased, the shape of low cover comes to be nonuniform and it becomes more difficult to maintain shape accuracy.

If the tread is pulled during the stitch-down, bonding position between the tread and the first cover may possibly deviate. If the tread rubber has high stiffness, this tendency becomes more noticeable.

Further, depending on the width of stitcher roller, it may slip over the tread surface, possibly causing scratches or wrinkles on the tread.

The low cover having such a problem must be discarded as a defective product, since such deficiencies affect tire performance such as FV (Force Variation).

If the tread rubber has low stickiness, wound strips may possibly collapse at the time of stitch-down, making formation of the low cover itself difficult.

In contrast, according to the present embodiment, the tread is formed separately as a center and sides of tread, the center is formed on the tread ring and the sides are formed on the first cover, and the center and sides are bonded simultaneously with the shaping of the first cover, as described above.

As a result, it becomes possible to eliminate or minimize stitch-down, and therefore, the above-described problems such as uneven shape of the low cover can be prevented. Thus, the shape of low cover can be maintained with high accuracy, and a pneumatic tire having stable tire performance such as FV can be manufactured with high efficiency.

The pneumatic tire thus manufactured has the same structure as the conventional tires, as described above. The equipment for the stitch-down step can be simplified or made unnecessary, and therefore, production efficiency can further be improved.

Further, in the present embodiment, the center of tread is formed to have the width substantially the same as the breaker or the band, and the sides of tread that have been subjected to stitch-down are formed on the first cover. Therefore, unlike the conventional method, the difficulty of bending rubber of high stiffness along the first cover and pasting it thereon can be avoided. As a result, the first cover and the tread ring can reliably be integrated regardless of the length or gauge of the tread, and low covers of high quality can be manufactured stably with high reproducibility.

An end of the tread entering a buttress portion of a pneumatic tire has, depending on its hardness, an influence on steering stability as well as RRC (Rolling Resistance Coefficient of tire) of a vehicle when the tire is mounted. According to the present embodiment, the length or gauge of the tread can freely be set and, therefore, such performances can appropriately be attained.

EXAMPLES

1. Formation of Samples

Using the pneumatic tire manufacturing method described in the embodiment above, as samples of each of Examples 1 to 5 and a Comparative Examples 1 to 2, 50 pneumatic tires having the SOT structure of the size 225/45R18 were made with the overlaps as shown in Table 1. Further, as samples of a conventional example, 50 pneumatic tires having the SOT structure were made using the conventional method with a stitcher moved two-dimensionally.

In Comparative Example 1, the center of tread and the sides of tread are in contact at a point (overlap: 0 mm), and in Comparative Example 2, a gap of 2 mm is formed between the center of tread and the sides of tread (overlap: −2 mm)

In Examples and Comparative Examples excluding Example 5, stitch-down was conducted using a stitcher. In Examples 1, 2 and 4 and Comparative Examples 1 and 2, the stitcher was moved straight (1-dimensional), while in Example 3, it was moved two-dimensionally, as in the conventional example.

2. Evaluation (1) Low Cover Formation Time

The time necessary for making the low cover of each sample was measured, an average time was calculated for each example, and evaluated as a ratio with the time of conventional example being 100.

(2) RFV OA

Overall RFV (Radial Force Variation) of each manufactured pneumatic tire was measured, and an average was calculated for each example, being evaluated as a ratio with the value of conventional example being 100.

(3) Frequency of Collapse of Wound Strips

When the low cover of each sample was formed, if the strip-shaped tread material (rubber strip) was collapsed or not was visually inspected, and the rate (frequency) of collapse was counted for each example.

(4) Variation in Tread Edge Position (R)

Formed pneumatic tires were visually inspected, and deviation of tread edge position from the design value was measured. The average value was calculated as the variation (R, unit: mm) of the tread edge position.

Results of evaluations described above are as shown in Table 1.

TABLE 1

| | Prior Art | Example | | | | | Comparative Example | |
|---|---|---|---|---|---|---|---|---|
| | | 1 | 2 | 3 | 4 | 5 | 1 | 2 |
| Stitcher movement | 2 dimensions | Straight | Straight | 2 dimensions | Straight | — | Straight | Straight |
| Overlap (mm) | | 5 | 10 | 5 | 15 | 5 | 0 | −2 |
| Low cover formation time (ratio) | 100 | 47 | 53 | 72 | 69 | 30 | 45 | 49 |
| RFVOA (ratio) | 100 | 81 | 76 | 73 | 88 | 77 | 91 | 111 |
| Frequency of collapse of wound strips (%) | 64 | 0 | 4 | 0 | 14 | 0 | 0 | 0 |
| Variation of tread edge position (R) (mm) | 5 | 2 | 2 | 2 | 2 | 2 | 2 | 2 |

From Table 1, it can be seen that in any of Examples 1 to 5 and Comparative Examples 1 to 2, the time necessary for forming the low cover was shorter than in the conventional example. Therefore, it is understood that by forming the tread separately as the sides and center of tread, the low cover can be formed in a shorter time period than by the conventional method.

In Examples 1 to 5 in which the sides and the center of tread were overlapped, RFV was significantly lower than the conventional example, whereas in Comparative Example 2 in which a gap is formed between the center of tread and the sides of tread (−2 mm), RFV was higher than in the conventional example. Therefore, it can be understood that by forming the tread separately as the sides and the center of tread and bonding these with appropriate overlapping, a pneumatic tire having improved tire performance can be manufactured.

Further, in any of the Examples, the frequency of collapse of strips was lower than the conventional example. Thus, it can be understood that the pneumatic tire can be manufactured with higher efficiency than the conventional example. Further, in Examples 1, 3 and 5, collapse of strips did not occur at all, and pneumatic tires could be formed reliably.

Further, in any of the Examples, variation of tread edge position was small, and it was confirmed that pneumatic tires having superior tire performance could be manufactured with high reproducibility.

Particularly, comparing Examples 1, 3 and 5, it was confirmed that pneumatic tires excellent in RFV and in which collapse of strips is hard to occur and variation of tread edge position is small can appropriately be formed in a shorter time period by forming the tread separately as the sides and the center of tread and bonding these appropriately without stitch-down as in Example 5.

The present invention has been described above with reference to the embodiments. However, the present invention is not limited to said embodiments. Various changes may be made on said embodiments within the scope identical or equivalent to that of the present invention.

DESCRIPTION OF THE REFERENCE NUMERALS 1, 1a, 1b, 1c, 50a, 50b, 50c Tread
10 Center of tread
10b, 12a, 12b Strip-shaped tread rubber materials
13a, 13b Side of tread
20 Second forming drum
22 Breaker
24 JLB (jointless band)
26 Tread ring
30 First forming drum
32 Inner liner
34a, 34b Sidewall (sw)
35 Ply
36a, 36b Bead
38 First cover
D1, D2, D3 Overlapping

What is claimed is:

1. A method of manufacturing a pneumatic tire having a sidewall-over-tread structure with a sidewall formed to cover tread ends, comprising:
   a first cover forming step of wrapping sidewalls on opposite end portions of a first forming drum, pasting an inner liner and a ply on the center of the first forming drum, setting a pair of beads inside said sidewalls, and forming sides of tread by strip-winding on said ply inside said beads, and thereby forming a first cover;
   a tread ring forming step of successively pasting, on a second forming drum, a breaker and a band and then forming a center of tread by strip-winding on said band, and thereby forming a cylindrical tread ring;

a shaping step of inserting said first cover inside said tread ring, and inflating that portion of said first cover which is between the said beads, and thereby pressure-bonding said tread ring with said first cover to form a shape of a low cover, and a turn-up step of turning said sidewalls outside of said beads toward side surfaces of said inflated first cover and pasting said sidewalls on the side surfaces of said first cover, wherein each of said sides of tread is formed at positions outside said band to be adjacent to respective ends of the center of tread in a tread width direction when the first cover is inflated at the shaping step, and bonding said sides of tread on the first cover and said center of tread on said tread ring at the turn-up step.

2. The method of manufacturing a pneumatic tire according to claim 1, wherein at said turn-up step, said sides of tread of the first cover and said center of tread on said tread ring are bonded, overlapped by at least 5 mm in the axial direction of the tire.

3. The method of manufacturing a pneumatic tire according to claim 2, wherein at said turn-up step, a bonding surface of said sides of tread of the first cover and said center of the tread on said tread ring is approximately vertical to the outer surface of said tread, or is a tapered surface inclined toward said sidewall from the outer surface of said tread to an inner surface of said tread.

4. The method of manufacturing a pneumatic tire according to claim 1, wherein at said turn-up step, a bonding surface of said sides of tread of the first cover and said center of the tread on said tread ring is approximately vertical to the outer surface of said tread, or is a tapered surface inclined toward said sidewall from the outer surface of said tread to an inner surface of said tread.

5. The method of manufacturing a pneumatic tire according to claim 1, wherein said center of tread and sides of tread comprise strip-shaped tread rubber material.

* * * * *